United States Patent [19]

Geary, Jr.

[11] 4,293,996
[45] Oct. 13, 1981

[54] METHOD FOR SECURING A WHEEL TO A ROTATABLE SHAFT
[75] Inventor: Carl H. Geary, Jr., Greensburg, Pa.
[73] Assignee: Carrier Corporation, Syracuse, N.Y.
[21] Appl. No.: 955,428
[22] Filed: Oct. 27, 1978
[51] Int. Cl.³ .............................................. B23P 11/02
[52] U.S. Cl. .................... 29/446; 29/526 R; 403/15
[58] Field of Search .............. 29/446, 526 R; 403/15, 403/31

[56] References Cited

U.S. PATENT DOCUMENTS

| | | | |
|---|---|---|---|
| 1,959,901 | 5/1934 | Buehle | 403/15 |
| 2,571,265 | 10/1951 | Leufven | 29/446 UX |
| 3,267,568 | 8/1966 | Johnson et al. | 29/446 UX |
| 3,462,180 | 8/1969 | Bunyan | 403/31 X |
| 3,819,286 | 6/1974 | Bianchi | 403/31 |
| 3,898,010 | 8/1975 | Jungbluth et al. | 403/15 |

Primary Examiner—Charlie T. Moon
Attorney, Agent, or Firm—J. Raymond Curtin; John G. Sensny

[57] ABSTRACT

A wheel of a turbomachine is secured to a shaft of the machine by initially securing the wheel between one end of the shaft and a piston-like member. A space is formed between opposed sides of the member and wheel by moving the member relative to the wheel. A spacing member is placed in the space for placing a compressive force on the wheel for positively securing the wheel to the shaft.

3 Claims, 1 Drawing Figure

U.S. Patent
Oct. 13, 1981
4,293,996
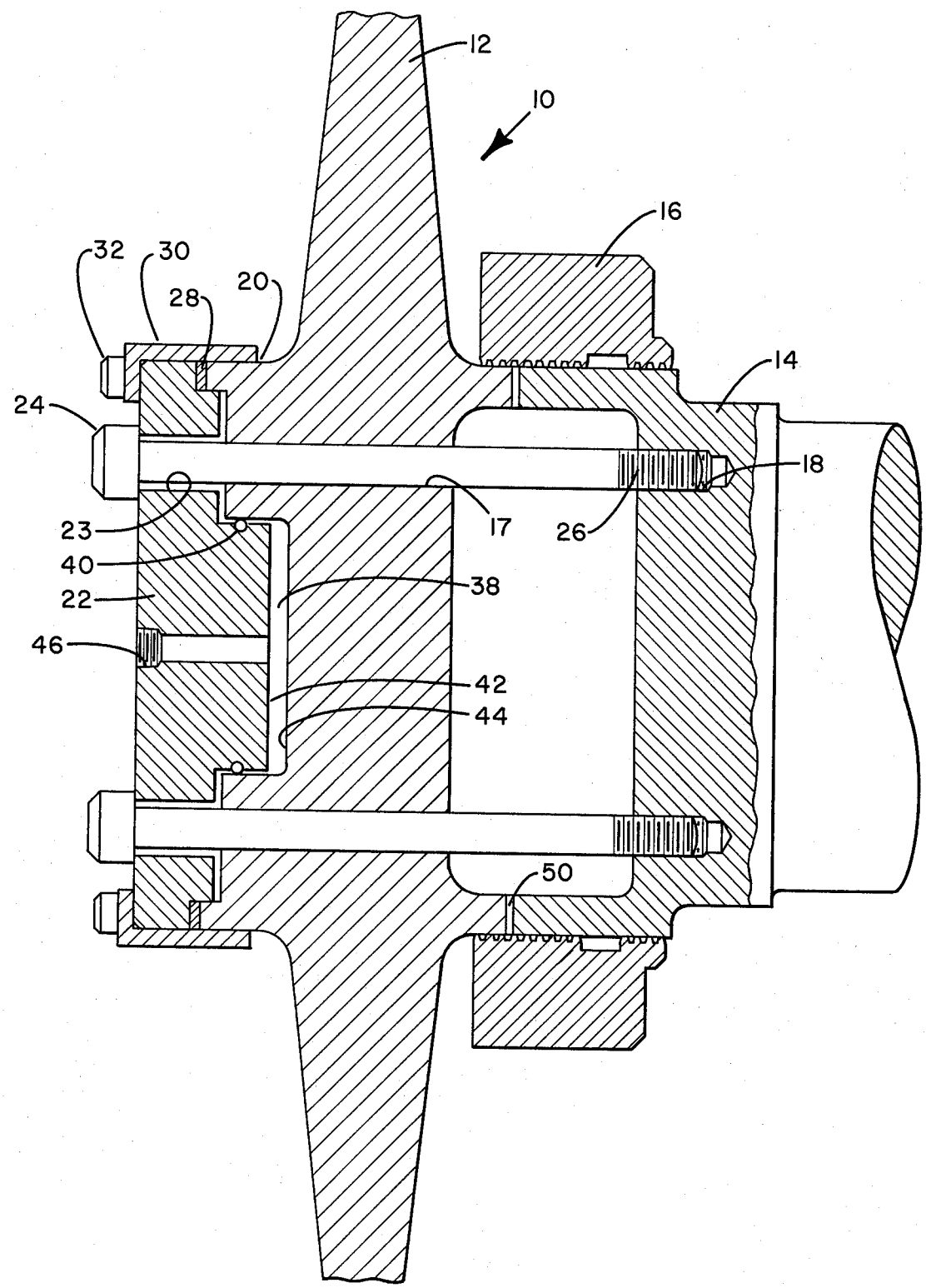

METHOD FOR SECURING A WHEEL TO A ROTATABLE SHAFT

BACKGROUND OF THE INVENTION

This invention relates to method and apparatus for securing a wheel member of a turbomachine to a rotatable shaft, and in particular to an arrangement which positively secures the wheel to the shaft without generating torsional forces.

Rotors of turbomachinery, such as centrifugal compressors and axial flow compressors and turbines, are at times manufactured as a composite structure, wherein the discs or wheels of the turbomachine are attached to stub shafts, which are fixed to the ends of a thru-bolt, sometimes referred to as a tie-bolt. In achieving the composite structure, heat has been applied to the thru-bolts for developing forces to positively secure the wheels to the shafts. In order to apply the heat, holes have been drilled through the entire length of the shafts, destroying the integrity of the shafts and increasing the problems associated with achieving dynamic and static balance of the rotor. In addition, alignment of the shaft journals has been difficult to achieve without complicated and relatively expensive manufacturing techniques. It has been suggested that the heating step used to positively secure the wheels to the shafts be eliminated, and that compression and torsional forces developed through the use of appropriate bolt and nut arrangements be used to achieve the desired joining of the disc and shaft.

However, turbomachinery employed in many applications, such as power recovery installations, operate at relatively high temperatures. Thus, the working strength of the various elements of the turbomachine are reduced as the working strength of a metallic component generally varies inversely to the temperature of the environment in which the component operates. The torsional forces developed in securing the disc to the shaft will generate torsional stresses. Such stresses may result in the failure of one or more of the bolts due to the relatively low value of the working strength of the bolts. Generally speaking, the shear strength of the bolts to withstand the torsional stresses is approximately one-half the tensile strength of the bolts at any given temperature. As is obvious, a failure of a connecting bolt may result in major damage to the turbomachine.

SUMMARY OF THE INVENTION

Accordingly, it is an object of this invention to eliminate torsional stresses developed in the means employed to secure a wheel to a shaft of a turbomachine rotor.

It is a further object of this invention to utilize tensile and compressive forces to secure the wheel to the shaft.

It is a further object of this invention to positively secure a wheel to a shaft without creating torsional stresses.

It is yet another object of this invention to provide a wheel secured to a shaft suitable for use in high temperature environments.

It is yet another object of this invention to secure and accurately attach the wheel to a shaft through a relatively inexpensive arrangement and method.

These and other objects of the present invention are attained in an apparatus for securing a wheel to a rotatable shaft which includes the utilization of bolt means for connecting the wheel to an end of the shaft. Means are connected to the bolt means for generating a hydraulic force for stretching the bolts. A compressive force is developed on the disc subsequent to the stretching of the bolts for positively securing the wheel to the shaft.

The present invention further includes a method of securing a wheel member to a rotatable shaft which includes the steps of securing the wheel between a first member and an end of the shaft. The member is moved relative to the wheel to form a space between opposed sides of the wheel and of the member. A spacing member is placed in the space formed between the wheel and the movable member to place a compressive force on the wheel for positively securing the wheel to the shaft.

BRIEF DESCRIPTION OF THE DRAWING

The single FIGURE of the drawing illustrates a sectional view of a portion of a turbomachine embodying the present invention.

DESCRIPTION OF THE PREFERRED EMBODIMENT

Referring now to the drawing, there is disclosed a preferred embodiment of the present invention. In particular, there is disclosed a portion of a turbomachine 10 comprising a wheel member such as disc 12 attached to rotate with a shaft 14, the disc and shaft forming in combination the rotor section of the turbomachine. Suitable axially extending seals, as for example labyrinth seals 16 are provided about shaft 14 to maintain leakage of the motivating fluid to a minimum. Shaft 14 is formed with a plurality of tapped holes 18, each of the tapped holes receiving therein a threaded end 26 of a bolt 24. Disc 12 includes a plurality of drilled holes or apertures 17, provided in axial alignment with threaded holes 18. Suitable torque transmitting means, such as coupling 50 join disc 12 to shaft 14 resulting in the joint rotation of the shaft and disc.

Turbomachine 10 may be a centrifugal compressor, an axial compressor, a radial or axial turbine. Wheel member 12 takes the form of an impeller when machine 10 is a centrifugal compressor and takes the form of a bladed disc when the machine is an axial compressor or turbine.

A piston-like member 22 is provided at one end of wheel 12 and is movably disposed in a chamber 38 defined by axially extending flanges 20 of the wheel. The piston includes a plurality of holes or apertures 23 provided in axial alignment with holes 17 and 18 respectively provided in wheel 12 and shaft 14. Bolts 24 thus extend axially through the piston-like member, the rotor disc, and terminate in the threaded hole formed in shaft 14.

Piston-like member 22 further includes a fluid opening 46. Opening 46 connects with a suitable conduit (not shown) to provide a high pressure fluid from a source thereof (not shown) to chamber 38. A suitable seal such as O-ring 40 is provided to prevent leakage of the high pressure fluid from chamber 38.

When wheel member 12 is positively secured to shaft 14, as for example when the rotor section is installed in the turbomachine's casing, the rotor includes annular shim member 28, provided between opposed sides 42 and 44 respectively of piston-member 22 and wheel member 12. The diameter of the shim member is equal to or less than the diameter of the piston-like member. A shim cover plate 30 is suitably attached, as for example by screws 32 to piston-like member 22.

As noted previously, it is desirable to minimize torsional stresses generated in the bolts used to secure the wheel to the shaft. The minimization or elimination of torsional stresses is particularly important in turbomachines utilized with relatively high temperature motivating fluids.

In securing piston-like member 22, wheel 12 and shaft 14 to form the rotor section of turbomachine 10, bolts 24 are initially placed through aligned holes 17, 18 and 23. The bolts are only lightly torqued to maintain the initial integrity of the rotor section. Ends 26 of bolts 24 are securely anchored within holes 18 of shaft 14 due to the mating engagement of the threaded sections. Shims 28 are not placed within the assembly at this time; opposed sides 42 and 44 are in direct contact with each other. High pressure hydraulic fluid is thence delivered to chamber 38 through connection 46. The fluid generates a force in the chamber to move piston-like member 22 relative to wheel 12 to expand the volumetric size of chamber 38. The movement of piston 22 results in the stretching of bolts 24 attached thereto and the compression of wheel 12. A space is formed between the opposed sides of the wheel and piston with shim 28 being placed in the space. Shim 28 is in direct contact with the opposed sides of piston 22 and wheel 12. Shim cover plate 30 is then attached to piston 22. After the bolts 24 have been stretched to their desired length, the fluid is exhausted from chamber 38.

By stretching bolts 24, the bolts are placed in tension. The tensile force thus developed is transmitted through piston member 22 and shim 28 as a compressive force acting against wheel 12 to maintain the wheel positively secured to shaft 14. Essentially, the only force acting on bolts 24 is the tensile force developed during the stretching of the bolts. Thus, the working strength of the bolts will not be decreased as a result of the generation of torsional forces and thus stresses acting thereon.

When it is desired to remove the wheel from the shaft, hydraulic fluid is reintroduced into chamber 38 to again stretch bolts 24 to eliminate the compressive force acting on wheel 12. The arrangement and method herein disclosed provides a relatively inexpensive means for positively securing the wheel of a turbomachine to a shaft. The arrangement finds particular applicability in turbomachines having a relatively high temperature working fluid flowing therethrough, where it is particularly important that torsional stresses be maintained at a minimum to prevent material fatigue.

While a preferred embodiment of the invention has been described and illustrated, the invention should not be limited thereto but may be otherwise embodied within the scope of the following claims.

What is claimed is:

1. A method of securing a wheel member to a rotatable shaft comprising the steps of:
    positioning the wheel member between a piston member and one end of the shaft, with the piston member extending into a chamber defined by the wheel member;
    passing a plurality of bolts through aligned apertures defined by the piston member and wheel member and into holes defined by the shaft;
    securing a first end of each bolt to the shaft;
    attaching a second end of each bolt to the piston member;
    delivering a pressurized fluid into the chamber defined by the wheel member to move the piston member relative to the wheel member and form a space therebetween;
    stretching the bolts as a result of the movement of the piston member attached thereto; and
    placing a spacing member in the space formed between the wheel member and the piston member to place a compressive force on the wheel member for positively securing the wheel member to the shaft.

2. A method as defined by claim 1 wherein the delivering step includes the step of conducting the pressurized fluid through a fluid opening defined by the piston member.

3. A method as defined by claim 2 further including the step of covering the spacing member to prevent movement thereof away from the piston member.

* * * * *